Feb. 28, 1961 R. WILSON 2,973,442
STATOR CORE MOUNTING FOR DYNAMO ELECTRIC MACHINE
Filed Sept. 11, 1958 3 Sheets-Sheet 1

INVENTOR
ROBERT WILSON
BY
Fuchstein, Fuchstein & Ottinger
ATTORNEYS

Feb. 28, 1961 R. WILSON 2,973,442
STATOR CORE MOUNTING FOR DYNAMO ELECTRIC MACHINE
Filed Sept. 11, 1958 3 Sheets-Sheet 3

INVENTOR
ROBERT WILSON
BY
ATTORNEYS

United States Patent Office 2,973,442
Patented Feb. 28, 1961

2,973,442

STATOR CORE MOUNTING FOR DYNAMO ELECTRIC MACHINE

Robert Wilson, Sutton, Coldfield, England, assignor to The General Electric Company Limited, London, England Filed Sept. 11, 1958, Ser. No. 760,423

Claims priority, application Great Britain Sept. 11, 1957

1 Claim. (Cl. 310—258)

This invention relates to dynamoelectric machines, and is concerned particularly with such machines of the kind in which the stator core is mounted in an inner frame which is supported in an outer frame by resilient means adapted to absorb vibrations in a direction radially of the machine, these vibrations arising from electromagnetic distortions occurring in the stator core due to the rotating machine field.

One object of the present invention is to provide an improved mounting and supporting arrangement for the stator core of a machine of this kind.

According to the present invention, in a dynamoelectric machine of the kind referred to, the resilient means comprise a number of beam springs arranged parallel to the axis of the machine and spaced around this axis, and the said frames are respectively connected to the beam springs at alternate positions spaced longitudinally of the machine, the said beam springs being substantially rigid in the longitudinal and tangential directions but flexible in the radial direction so as to permit a limited amount of relative radial movement between the two frames, and therefore to prevent the transmission of radial movement from the inner frame to the outer frame.

The inner frame may be supported by a single set of beam springs extending substantially the whole length of the inner frame, or alternatively by two or more sets of beam springs which sets are spaced longitudinally of the machine. A frame may be provided with annular ribs whereby it is connected to the beam springs.

Figure 1:
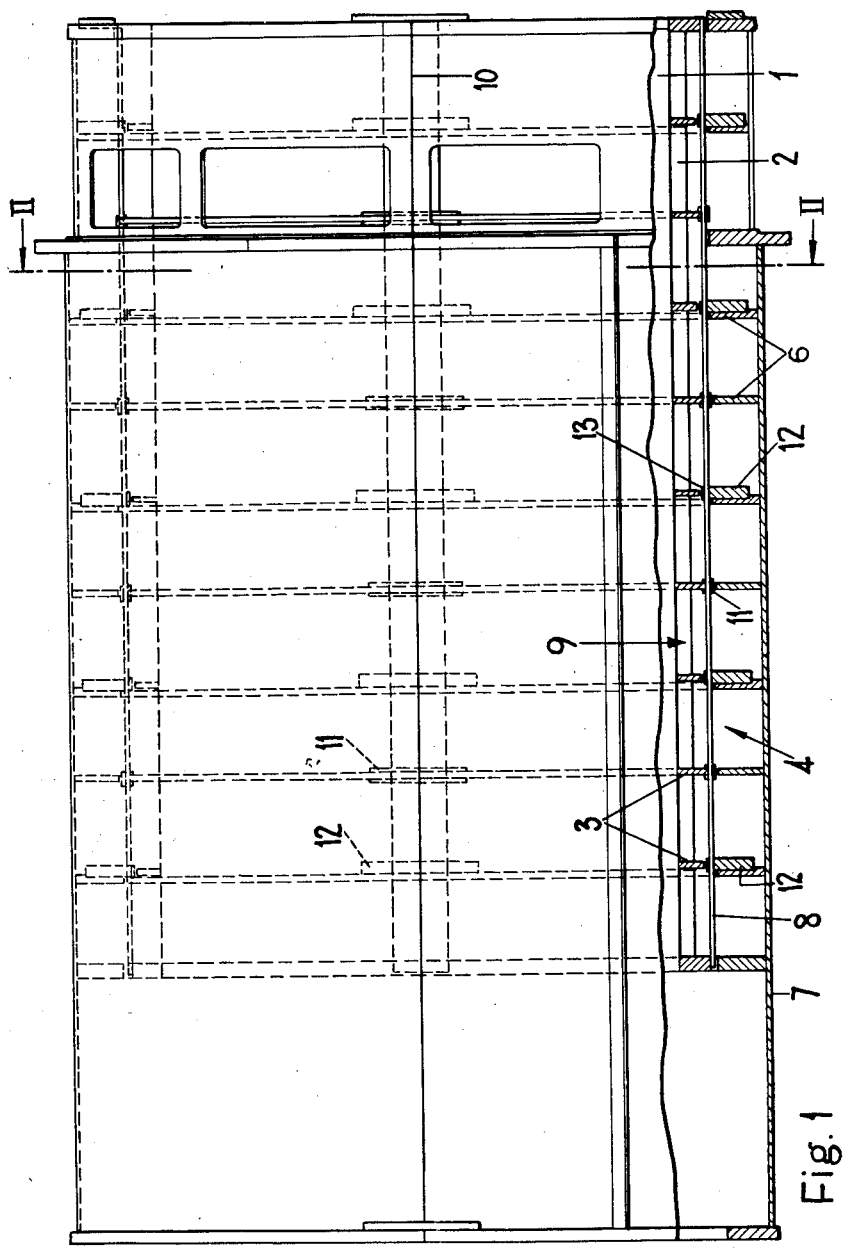
Figure 2:
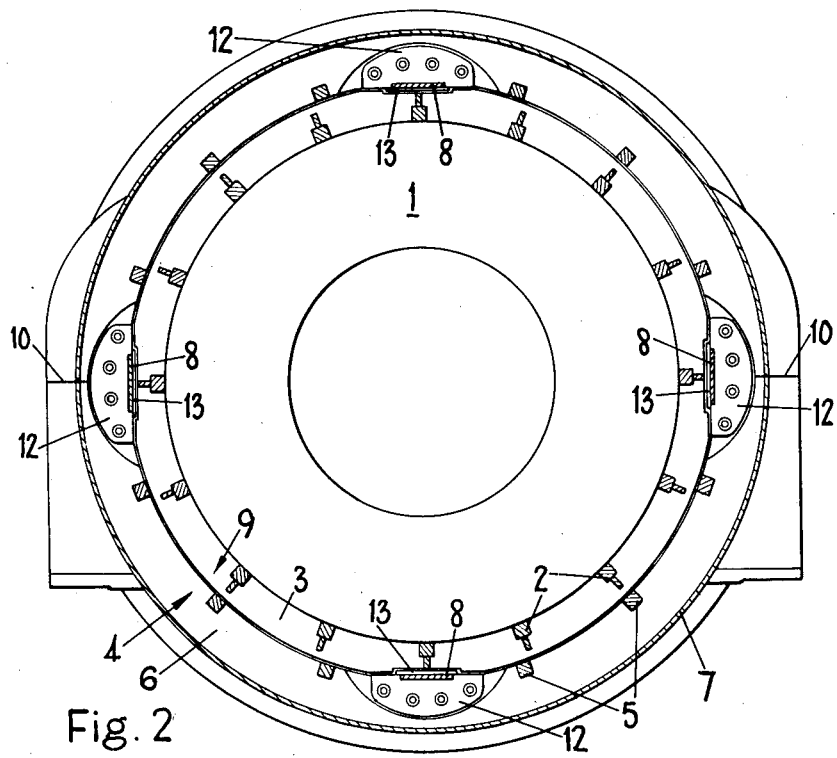

In order that the invention may be clearly understood, one embodiment as applied to a turboalternator having an output of say, 275 megawatts, will now be described, by way of example, with reference to the accompanying drawings, in which Figure 1 is a part-sectional elevation of the machine; Figure 2 is a section on line II—II in Figure 1; and Figures 3, 4, 5 and 6 show details of construction of the machine. Referring to the drawings, the stator core 1 of the machine is rigidly mounted within an inner frame 9 or shell which comprises a number of longitudinal support bars 2 disposed around the axis of the machine and a number of annular ribs 3 spaced longitudinally. Associated with casing 7 of the machine is a fixed outer frame or shell 4 which comprises a number of longitudinal bars 5 disposed around the axis, and a number of inwardly projecting annular ribs 6 spaced longitudinally. The inner frame 9 is resiliently supported within the outer frame by four beam springs 8 which are parallel to the axis of the machine and spaced equally around the axis, these beam springs being connected to the inner frame along their length. Intermediately between the connections of the beam springs to the inner frame these springs are connected to the inwardly projecting ribs of the outer frame so that the two frames are respectively connected to the beam springs at alternate positions spaced longitudinally of the machine.

Figure 3:
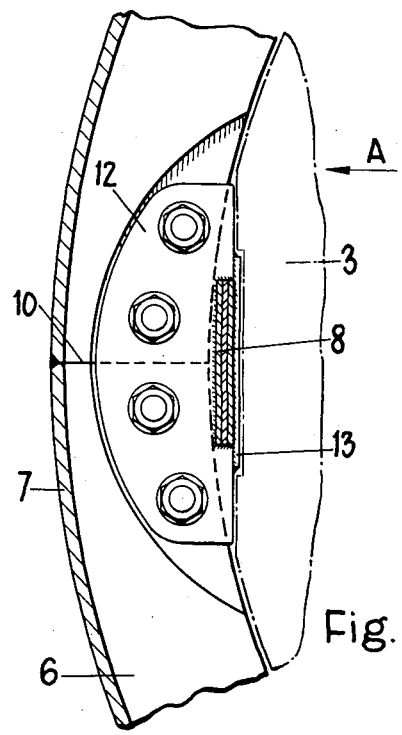
Figure 4:
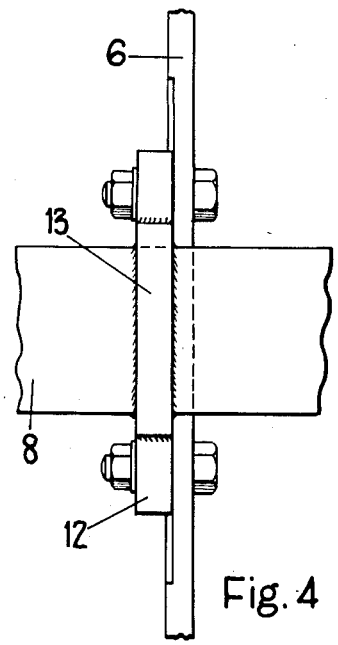
Figure 5:
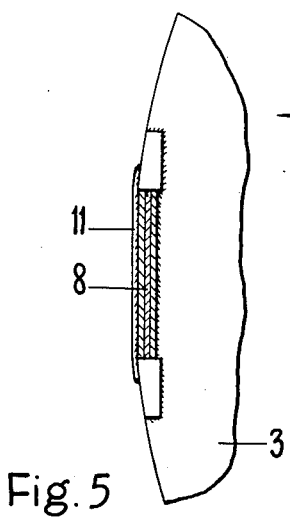
Figure 6:
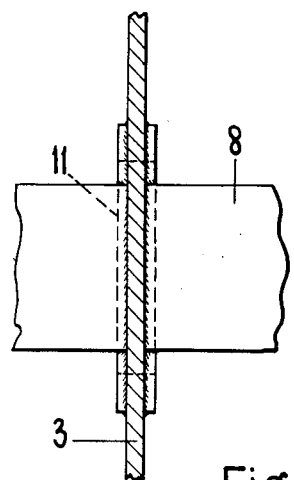

The method by which the springs are connected to the outer frame is illustrated in Figures 3 and 4, Figure 4 being a view in the direction of the arrow A in Figure 3, while the method by which the inner frame is connected to the springs is illustrated in Figures 5 and 6, Figure 6 being a view in the direction of the arrow B in Figure 5.

Each beam spring is a laminated member comprising, say, three spring plates. The springs are arranged so as to be substantially rigid in the longitudinal and tangential directions but flexible in the direction radial of the machine so as to permit a limited amount of relative radial movement between the two frames, and therefore to prevent the transmission of radial movement from the inner frame to the outer frame.

The casing 7 and outer frame of the machine are split in the horizontal diametrical plane as shown at 10, the upper half of the casing being welded in position after the stator core is mounted.

In assembling the machine the beam springs 8 are first connected to the inner frame 9 in which the stator core is rigidly mounted, alternate ribs in this frame being recessed to receive the springs and the remaining ribs being left clear of the springs. The springs are welded to these ribs in the recesses and retaining plates 11 are welded in position over the springs to reinforce the joints. The ribs 3 of the inner frame which are not connected to the springs are spaced from the latter. At positions along the springs 8 corresponding to the unconnected ribs 3 outwardly projecting connecting plates 12 are welded to each of the springs, these plates being recessed at their inner edges to receive the springs; a retaining plate 13 is welded in position over each recess. Finally the connecting plates 12 are bolted to alternate inwardly projecting ribs 6 in the outer frame, the intermediate ribs being left unconnected and spaced from the springs, and the upper half of the casing 7 is welded in position.

I claim:

In a dynamoelectric machine, of a type having a stator core in which electromagnetic distortions due to the rotating machine field may occur, a stator mounting arrangement comprising an inner frame housing said stator core, said inner frame comprising longitudinal support bars disposed around the axis of the machine and longitudinally spaced ribs projecting outwardly from said support bars, a fixed outer frame disposed around said inner frame, said outer frame comprising longitudinal bars disposed around the axis of the machine and longitudinally spaced ribs projecting inwardly from said bars, and a plurality of laminated beam springs extending axially along the whole length of the machine between said frames and spaced apart around the axis thereof, said inwardly projecting ribs and outwardly projecting ribs being respectively connected to said beam springs at alternately spaced positions along the length of the machine, and said beam springs being substantially rigid in the longitudinal and tangential directions but flexible in the radial direction so as to permit relative radial movement between said frames.

References Cited in the file of this patent

UNITED STATES PATENTS

| | | |
|---|---|---|
| 2,754,441 | Morgan | July 10, 1956 |
| 2,811,659 | Barlow et al. | Oct. 29, 1957 |